United States Patent
Khoury et al.

(10) Patent No.: US 10,956,008 B2
(45) Date of Patent: *Mar. 23, 2021

(54) AUTOMATIC HOME SCREEN DETERMINATION BASED ON DISPLAY DEVICE

(71) Applicant: Microsoft Technology Licensing, LLC, Redmond, WA (US)

(72) Inventors: Issa Yousef Khoury, Redmond, WA (US); Petteri Jussinpoika Mikkola, Bellevue, WA (US); Abolade Gbadegesin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,504

(22) Filed: Aug. 13, 2018

(65) Prior Publication Data

US 2018/0349001 A1 Dec. 6, 2018

Related U.S. Application Data

(63) Continuation of application No. 14/591,509, filed on Jan. 7, 2015, now Pat. No. 10,073,599.

(51) Int. Cl.
*G06F 3/0484* (2013.01)
*A61M 5/172* (2006.01)
(Continued)

(52) U.S. Cl.
CPC ........ *G06F 3/04845* (2013.01); *G06F 3/1423* (2013.01); *H04N 21/4108* (2013.01);
(Continued)

(58) Field of Classification Search
CPC .... G16H 15/00; G16H 40/63; G06F 3/04817; G06F 3/04883; G06F 3/0488;
(Continued)

(56) References Cited

U.S. PATENT DOCUMENTS 9,733,804 B2 * 8/2017 Huang ................. G06F 3/0484
10,365,811 B2 * 7/2019 Robinson ............ G06F 3/04817
(Continued)

FOREIGN PATENT DOCUMENTS

| CN | 102999160 A | 3/2013 |
| CN | 103282955 A | 9/2013 |
| CN | 103793170 A | 5/2014 |

OTHER PUBLICATIONS

Lee et al., Implementation of cloud server for home screen based on smart TV, 2 pages (Year: 2014).*

(Continued)

*Primary Examiner* — Thuy Dao

(57) ABSTRACT

A mobile computing device, such as a smartphone or tablet device, can be coupled to any one or more of multiple display devices at any given time. The mobile computing device allows the home screen displayed on the display devices to be dynamic, changing based on which display device the mobile computing device is coupled to. The mobile computing device can also be coupled to multiple different display devices concurrently, and different home screens are concurrently displayed on those different display devices. User inputs changing the information displayed on the home screen can also be received, and a record of the change is maintained by the computing device so the changed home screen for a particular display device is again displayed to the user the next time the mobile computing device is coupled to that display device.

20 Claims, 8 Drawing Sheets

(51) Int. Cl.

| | |
|---|---|
| *A61B 5/00* | (2006.01) |
| *G06F 3/0481* | (2013.01) |
| *G06F 3/0488* | (2013.01) |
| *G06F 3/14* | (2006.01) |
| *H04N 21/41* | (2011.01) |
| *H04N 21/414* | (2011.01) |
| *H04N 21/431* | (2011.01) |
| *H04N 21/47* | (2011.01) |
| *H04N 21/485* | (2011.01) |
| *H04N 21/488* | (2011.01) |
| *H04N 21/81* | (2011.01) |

(52) U.S. Cl.
CPC ... *H04N 21/4122* (2013.01); *H04N 21/41407* (2013.01); *H04N 21/4312* (2013.01); *H04N 21/47* (2013.01); *H04N 21/4858* (2013.01); *H04N 21/4882* (2013.01); *H04N 21/812* (2013.01)

(58) Field of Classification Search
CPC .... G06F 3/0482; G06F 3/0416; G06F 3/0481; H04N 21/4108; H04N 21/4122; H04N 21/41407; H04N 2/4312; H04N 21/47; H04N 21/4858; H04N 21/812
See application file for complete search history.

(56) References Cited

U.S. PATENT DOCUMENTS

| | | | |
|---|---|---|---|
| 2009/0023475 A1* | 1/2009 | Chang | H04M 1/72527 455/557 |
| 2012/0274656 A1* | 11/2012 | Kang | G06F 1/1632 345/619 |
| 2012/0309433 A1* | 12/2012 | Jeong | H04M 1/72583 455/457 |
| 2013/0162502 A1 | 6/2013 | Lee et al. | |
| 2013/0328878 A1* | 12/2013 | Stahl | G06T 3/40 345/428 |
| 2014/0075377 A1* | 3/2014 | Kang | G06F 3/04842 715/788 |
| 2014/0101609 A1* | 4/2014 | Bamford | G06F 3/0483 715/810 |
| 2014/0123022 A1* | 5/2014 | Lee | H04M 1/72566 715/747 |

OTHER PUBLICATIONS

"Office Action and Search Report Issued in Chinese Patent Application No. 201580072774.8", dated May 20, 2019, 7 Pages (W/o English Translation).
"First Examination Report issued in Indian Patent Application No. 201717023339", dated Jul. 2, 2020, 6 Pages.
"Office Action Issued in European Patent Application No. 15826260.0", dated Dec. 9, 2020, 7 Pages.

* cited by examiner

AUTOMATIC HOME SCREEN DETERMINATION BASED ON DISPLAY DEVICE

CLAIM OF PRIORITY

This application is a continuation of and claims priority to U.S. patent application Ser. No. 14/591,509, filed Jan. 7, 2015, entitled "Automatic Home Screen Determination Based on Display Device", the entire disclosure of which is hereby incorporated by reference herein in its entirety.

BACKGROUND

As computing technology has advanced, the capabilities of computing devices as well as related accessories, such as display devices, have grown. These capabilities have allowed increasingly large display devices, as well as the coupling of multiple display devices to a computing device. While these advances have provided benefits, they are not without their problems. One such problem is that it remains difficult for users to easily use and configure such multiple display devices in the manner that the users desire, leading to user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a mobile computing device an identifier of a display device to which the mobile computing device is coupled is determined, and a home screen is displayed on the display device, the home screen having a state based on the identified display device. A user input changing the state of the home screen is received, the changing including changing the user experience presented by the home screen. The changed state of the home screen is saved, and in response to the mobile computing device being subsequently coupled to the display device, the home screen having the changed state is displayed.

In accordance with one or more aspects, in a mobile computing device a first home screen is displayed on a first display device of multiple display devices, the first home screen having a state based on an identifier of the first display device. Concurrently with displaying the first home screen on the first display device, a second home screen is displayed on a second display device of the multiple display devices, the second home screen having a state based on an identifier of the second display device. The mobile computing device controls the first home screen and the second home screen independently of one another, allowing each home screen to remain active simultaneously.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Automatic home screen determination based on display device is discussed herein. A mobile computing device, such as a smartphone or tablet device, can be coupled to multiple different display devices. These display devices include display devices that are separate from the computing device (e.g., television displays, desktop monitors, automotive PCs, tablet displays, thin-client laptops (e.g., having just a screen and keyboard), a projector, and so forth as discussed in more detail below) as well as display devices that are part of the computing device (e.g., a built-in display of the computing device). The mobile computing device can be coupled to any one or more of these multiple display devices at any given time.

The mobile computing device includes an automatic home screen determination system that allows the home screen displayed on the display devices to be dynamic, changing based on which display device the mobile computing device is coupled to. For example, a home screen with certain user-selectable tiles or icons, menus, and so forth can be displayed on a desktop monitor, while a different home screen with different user-selectable tiles or icons can be displayed on a television. The mobile computing device automatically displays the proper home screen on each display device that the mobile computing device is coupled to. User inputs changing the information displayed on the home screen can also be received (e.g., adding or removing user-selectable tiles or icons, rearranging user-selectable tiles or icons, and so forth). In response to such user inputs, the information displayed on the home screen is changed and a record of the change is maintained by the automatic home screen determination system, so the changed home screen for a particular display device is again displayed to the user the next time the mobile computing device is coupled to that display device.

The mobile computing device can be coupled to multiple different display devices concurrently, and the automatic home screen determination system provides different home screens for concurrent display on those different display devices. This allows the user to use the different display devices independently. For example, the mobile computing device may be coupled to a desktop monitor and display a home screen for the user to perform various productivity-related tasks, and concurrently display a home screen on a display device that is part of the mobile computing device for the user to use the mobile computing device as a telephone.

Figure 1:
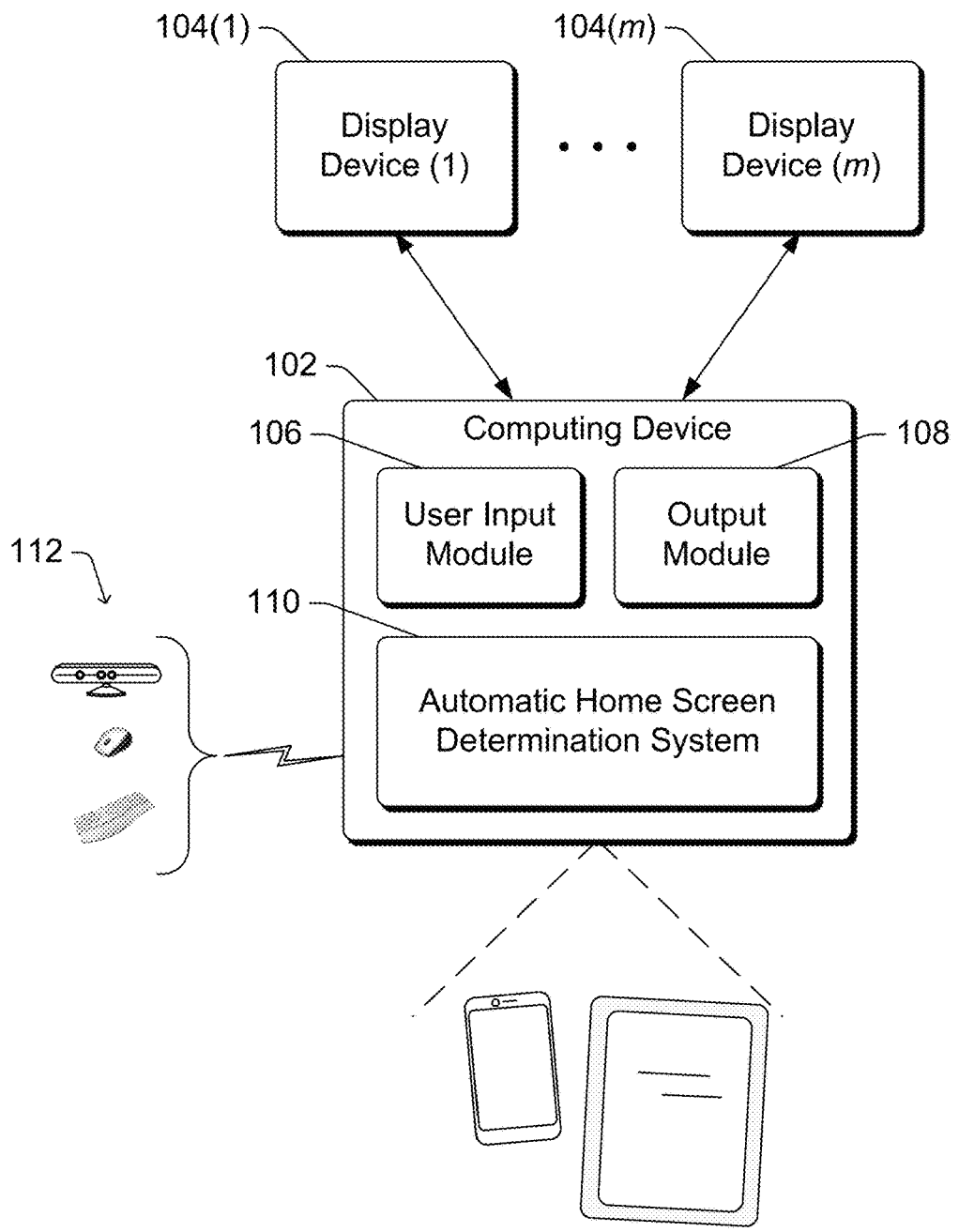
FIG. 1 illustrates an example system implementing the automatic home screen determination based on display device in accordance with one or more embodiments.

FIG. 1 illustrates an example system 100 implementing the automatic home screen determination based on display device in accordance with one or more embodiments. System 100 includes a computing device 102 that can be communicatively coupled to one or more (m) display devices 104. The computing device 102 can be a variety of different types of devices, and typically is a mobile device such as a tablet or phablet device, a cellular or other wireless phone (e.g., a smartphone), a notepad computer, a laptop or netbook computer, a wearable device (e.g., eyeglasses, watch), and so forth. Alternatively, the computing device 102 can be other types of devices that are not typically considered to be mobile devices, such as an entertainment device (e.g., an entertainment appliance, a set-top box communicatively coupled to a display device, a game console), a desktop computer, a server computer, a television, and so forth.

The computing device 102 can be coupled to each display device 104 in different manners, including wired couplings (e.g., universal serial bus (USB), DisplayPort, high-definition multimedia interface (HDMI), etc.) and/or wireless couplings (e.g., wireless USB, Bluetooth, etc.). The computing device 102 can be coupled to different display devices 104 in the same or different manners. The display devices 104 can be display devices that are external to the computing device 102 (in a housing separate from the computing device 102), such as a desktop monitor or living room television, an automotive display device, a tablet display device, and so forth. The display devices 104 can be standalone display devices (e.g., display devices with little or no processing or other computing device capabilities, such as a desktop monitor) or can be included as part of other computing devices (e.g., a display device of an automotive PC, a display device of a tablet, a display device of a smart TV (e.g., that is capable of running various software programs), and so forth). The display devices 104 can also be display devices that are internal to the computing device 102 (in a same housing as the computing device 102), such as a smartphone display or projector.

The computing device 102 includes a user input module 106, an output module 108, and a display device based automatic home screen determination system 110. Although particular functionality is discussed herein with reference to the modules 106 and 108 as well as the system 110, it should be noted that the functionality of individual ones of the modules 106 and 108 as well as the system 110 can be separated into multiple modules and/or systems, and/or at least some functionality of the multiple modules 106 and 108 as well as the system 110 can be combined into a single module and/or system.

The user input module 106 receives user inputs from a user of the computing device 102. User inputs can be provided in a variety of different manners, such as by pressing one or more keys of a keypad or keyboard of the device 102, pressing one or more keys of a controller (e.g., remote control device, mouse, track pad, etc.) of the device 102, pressing a particular portion of a touchpad or touchscreen of or coupled to the device 102, making a particular gesture on a touchpad or touchscreen of or coupled to the device 102, and/or making a particular gesture on a controller (e.g., remote control device, mouse, track pad, etc.) of the device 102. User inputs can also be provided via other physical feedback input to the device 102, such as tapping any portion of the device 102, an action that can be recognized by a motion detection or other component of the device 102 (such as shaking the device 102, rotating the device 102, bending or flexing the device 102, etc.), and so forth. User inputs can also be provided in other manners, such as via voice or other audible inputs to a microphone, via motions of hands or other body parts observed by an image capture device, and so forth.

The output module 108 generates, manages, and/or outputs content for display, playback, and/or other presentation. This content can be created by the output module 108 or obtained from other modules of the computing device 102. This content can be, for example, a display or playback portion of a user interface (UI), including a home screen. The content can be displayed or otherwise played back by components of the computing device 102 (e.g., speakers, interactive display devices, etc.). Alternatively, the output module 108 can generate one or more signals that are output to other devices or components (e.g., speakers, display devices, etc.) that are separate from the computing device 102.

The automatic home screen determination system 110 automatically determines the home screen to display for a particular display device 104 based on the particular display device 104. The home screen, also referred to as a start screen, is the displayed screen from which the user can request to run various different programs of the computing device 102. In one or more embodiments, the home screen is the first screen with user-selectable representations of functionality displayed after the user logs into (or turns on or wakes up) the computing device 102. Various different user-selectable representations of functionality can be included on a home screen, such as tiles, icons, widgets, menus, menu items, and so forth, and these different representations can be selected via any of a variety of different user inputs as discussed above. The functionality refers to different functions or operations that can be performed by the computing device, such as running one or more applications or programs, displaying or otherwise presenting particular content, and so forth. In one or more embodiments, the entirety of the home screen is displayed at the same time. Alternatively, different portions (also referred to as pages) of the home screen can be displayed at different times, and the user can navigate to these different portions using any of a variety of user inputs (e.g., left and right arrows, gestures such as swiping to the left or right, and so forth).

The home screen for a particular display device 104 can be determined based on the type of the display device 104, and optionally based on the specific or individual display device 104 itself (e.g., display devices of the same type, or even the same make and model, can have different home screens). The home screens for various display devices 104 can also be personalized by a user of the computing device 102, and the personalized home screen is displayed each time the computing device 102 is coupled to that display device 104.

The automatic home screen determination system 110 can be implemented in a variety of different manners. In one or more embodiments, the automatic home screen determination system 110 is implemented as part of an operating system running on the computing device 102. Alternatively, the automatic home screen determination system 110 is implemented partly in the operating system of the computing device 102 and partly as an application (e.g., a companion application) that runs on the operating system of the computing device 102. Alternatively, the automatic home screen determination system 110 is implemented as an application that runs on the operating system of the computing device 102, such as a launcher or container application that displays the home screen.

The computing device 102 can also optionally be coupled to one or more peripheral devices 112, such as a video camera, a mouse or other cursor control device, a keyboard, and so forth. The computing device 102 can be coupled to a peripheral device 112 in a variety of different manners. By way of example, the peripheral device 112 can be connected to (e.g., wirelessly or wired) a display device 104 that is communicatively coupled to the computing device 102. By way of another example, the peripheral device 112 can be connected to (wirelessly or wired) an intermediary device (e.g., a docking station) to which a display device 104 and the computing device 102 are both communicatively coupled. By way of yet another example, the peripheral device 112 can be connected to (wirelessly or wired) the computing device 102 directly.

Figure 2:
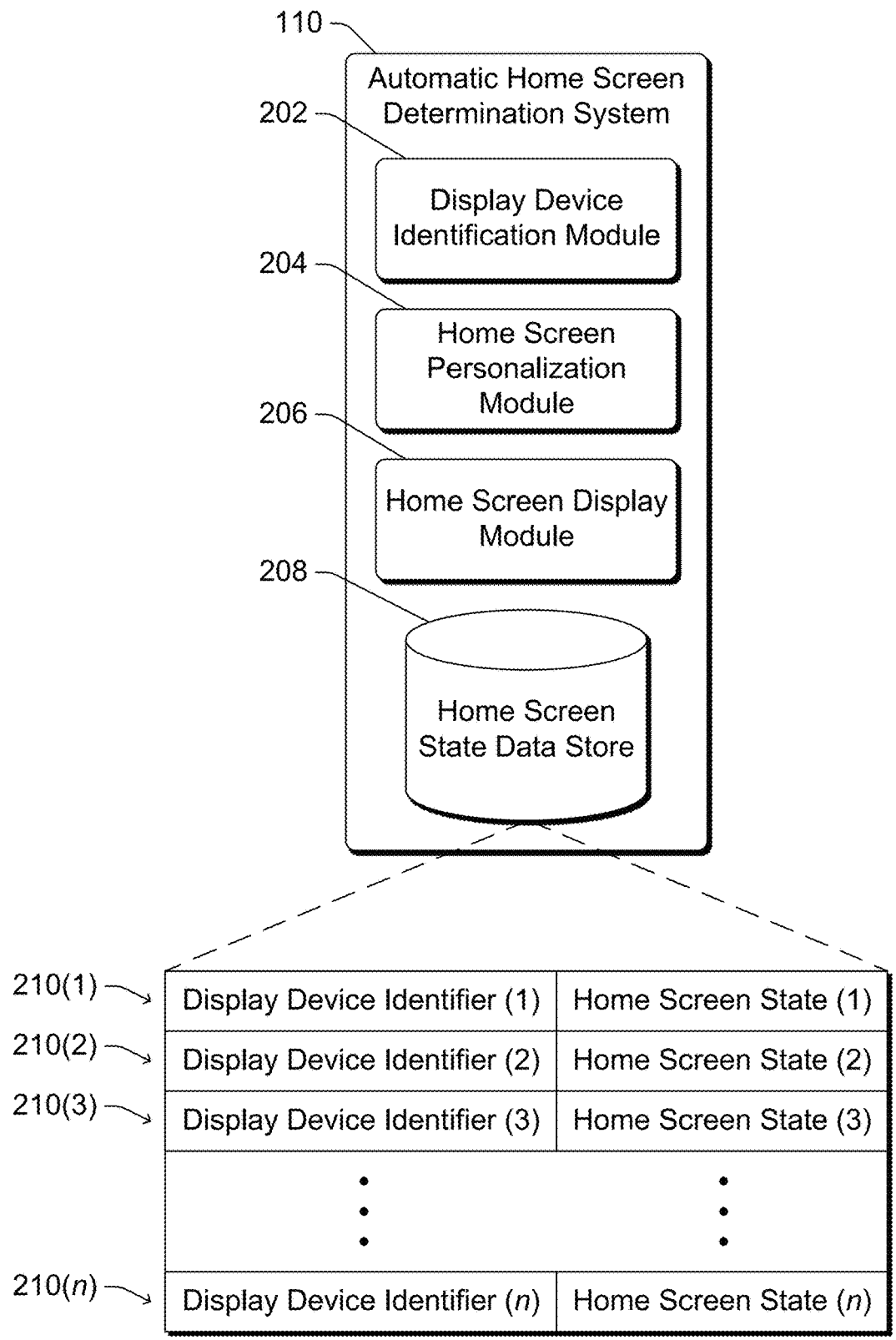
FIG. 2 illustrates an example automatic home screen determination system in additional detail in accordance with one or more embodiments.

FIG. 2 illustrates an example automatic home screen determination system in additional detail in accordance with one or more embodiments. The automatic home screen determination system 110 includes a display device identification module 202, a home screen personalization module 204, a home screen display module 206, and a home screen state data store 208. The display device identification module 202 automatically determines an identifier for each display device to which the automatic home screen determination system 110 is coupled (also referred to as identifying the display device). The determination of an identifier of a display device is performed, for example, in response to the establishment of the communication coupling (wired or wireless) between the display device and the computing device that includes the system 110.

The display device identification module 202 can identify a display device by type of display device and/or by specific display device. The type of the display device refers to a class or category of display device, such as a desktop monitor, a television, a portable device display, an automatic PC, and so forth. Each type of display can include multiple different makes and/or models of display devices. The specific display device refers to an individual display device. Different display devices of the same type, including different display devices of the same make and model, are each a specific display device.

The display device identification module 202 can identify a display device in a variety of different manners. In one or more embodiments, the display device sends a configuration value (e.g., a flag or other value) identifying the type of display device and/or the specific display device. The display device can have been pre-configured with this configuration value, have been assigned the configuration value by a distributor or other service, and so forth. The display device identification module 202 can thus automatically identify the display device based on this received configuration value.

Additionally or alternatively, the display device identification module 202 can automatically identify the display device based on a context or characteristics of the display device. The context of a display device refers to the environment in which the display device is present, such as which peripheral devices are connected to the display device and/or to the computing device implementing the automatic home screen determination system 110, the physical location of the display device and/or the computing device implementing the automatic home screen determination system 110, a mobility state of the display device and/or the computing device implementing the automatic home screen determination system 110, which user is logged into the computing device, combinations thereof, and so forth. The display device identification module 202 obtains information identifying the context of the display device, and applies various rules or algorithms to identify the display device based on the obtained information.

By way of example, the display device identification module 202 can identify the display device as a desktop monitor if the display device is coupled to mouse and keyboard peripheral devices. By way of another example, the display device identification module 202 can identify the display device as a desktop monitor if the display device is at a particular physical location associated with the user's workplace (e.g., as determined by one or more wireless networks to which the computing device implementing the automatic home screen determination system 110 can connect, as determined by global positioning system (GPS) coordinates obtained from a GPS module of the computing device implementing the automatic home screen determination system 110). By way of yet another example, the display device identification module 202 can identify the display device as a display included in a mobile computing device if the display device is moving at greater than a threshold speed such as 2 miles per hour (e.g., as determined by a GPS module, accelerometer, or other module of the computing device implementing the automatic home screen determination system 110).

The characteristics of the display device refer to physical parameters or aspects of the display device, such as one or more of the size of the display device (e.g., dimensions of the display), a type of display technology used (e.g., plasma display, light-emitting diode (LED) display, organic light-emitting diode (OLED) display), a display device resolution or pixel density, combinations thereof, and so forth. The display device identification module 202 obtains (e.g., from the display device) information identifying the characteristics of the display device, and applies various rules or algorithms to identify the display device based on the obtained information. For example, a display device having a size that satisfies (e.g., is less than, or is less than or equal to) a first threshold value (e.g., 13 inches) is identified as a display device included in a mobile computing device, a display device having a size that does not satisfy the first threshold value but satisfies a second threshold value (e.g., 32 inches) is identified as a desktop monitor display device, and a display device having a size that does not satisfy either of the first threshold value or the second threshold value is identified as a television display device.

The display device identification module 202 can also receive user input identifying a particular display device, the user input specifying a type of the display device and/or a specific display device. The user input can be received in any of a variety of different manners as discussed above. In one or more embodiments, the user input overrides any automatic determination of the display device made by the display device identification module 202. For example, based on the context of the display device or a configuration value received from the display device, the display device identification module 202 may automatically identify the display device as a desktop monitor. However, the user may desire to use the display device as an entertainment device, and thus can identify the display device as a television. The user input overrides the automatic determination, so the specific display device in this example is identified as a television rather than a desktop monitor.

The home screen state data store 208 is a record of identified display devices and corresponding home screen states. The home screen state data store 208 can be implemented as any of a variety of storage devices, such as flash memory, magnetic disk, optical disc, and so forth. The home screen state data store 208 maintains multiple entries 210(1), ..., 210(n), each entry identifying a display device and a corresponding home screen state. Although illustrated in a table format, it should be noted that the home screen state data store 208 can be implemented using any of a variety of different data structures.

A home screen state refers to a particular user experience displayed or otherwise presented to the user, including a particular configuration of representations of functionality on the home screen. This configuration includes the locations of representations of functionality, the sizes of representations of functionality, which representations of functionality are displayed (e.g., which functionalities are represented and/or how the functionalities are represented), and so forth. For example, the configuration can include whether menu items, tiles, or icons are displayed, where on the display device those menu items, tiles, or icons are displayed, a size or resolution of the menu items, tiles, or icons that are displayed, and so forth. The home screen state can optionally include one or more of various other user experience characteristics or parameters that describe how a user can interact with the home screen. For example, the home screen state can include user experience characteristics or parameters indicating types of input that can be received by the home screen (e.g., whether voice input and/or touchscreen input is supported), which applications or programs can be run or executed from the home screen, and so forth. The home screen display module 206 controls display of the home screen, so given a particular display device identifier as determined by the display device identification module 202, the home screen display module 206 displays the appropriate home screen having the state corresponding to the determined display device identifier.

In one or more embodiments, a display device can exist in multiple different environments and be identified as a different display device in each different environment. For example, the context of a display device may include an indication of which of multiple users is logged into the computing device, and different entries 210 can correspond to different users. E.g., the same desktop monitor may have one home screen state if a parent is logged into the computing device, and another home screen state if a child is logged into the computing device. By way of another example, the context of a display device may include a mobility state of the display device (e.g., whether the display device is moving, a speed at which the display device is moving, etc.), and different entries 210 can correspond to different mobility states. E.g., the same automotive display may have one home screen state if the display device is moving at greater than a threshold speed, and another home screen state if the display device is not moving (or is moving at less than or equal to the threshold speed).

Figure 3:
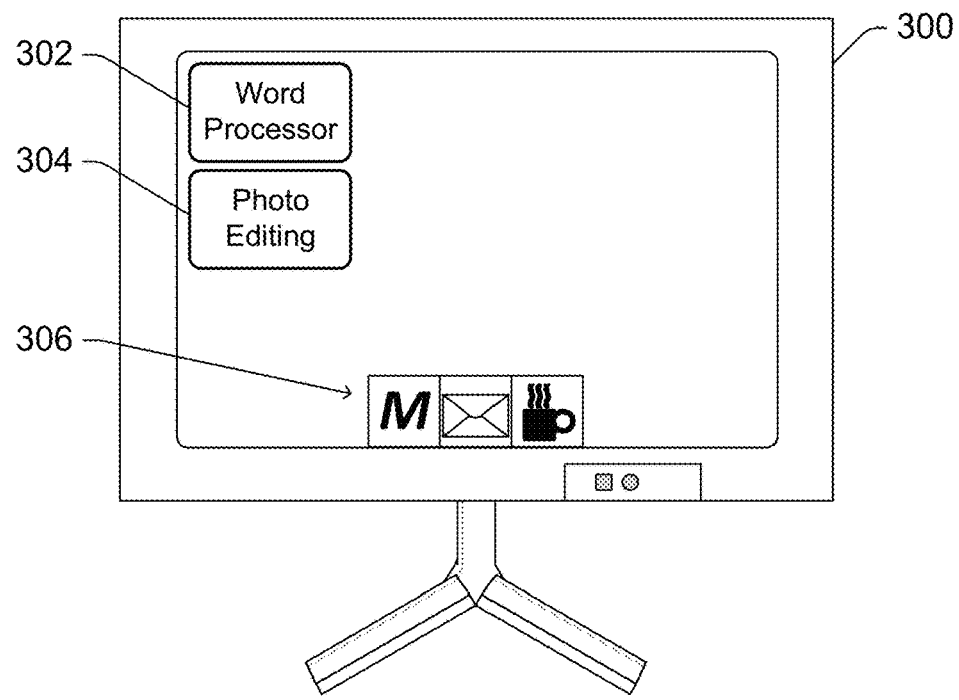
FIGS. 3, 4, 5, and 6 illustrate example home screens for different types of display devices.

FIGS. 3-6 illustrate example home screens for different types of display devices. FIG. 3 illustrates a display device 300 that is a desktop monitor, and a home screen that includes two user-selectable representations 302 and 304. A word processing program is run or otherwise activated in response to user selection of the representation 302, and a photo editing program is run or otherwise activated in response to user selection of the representation 304. A row or bar of user-selectable representations 306 are also displayed, and an appropriate program (e.g., for messaging, email, or navigational map display) is run or otherwise activated in response to selection of the corresponding representation 306.

Figure 4:
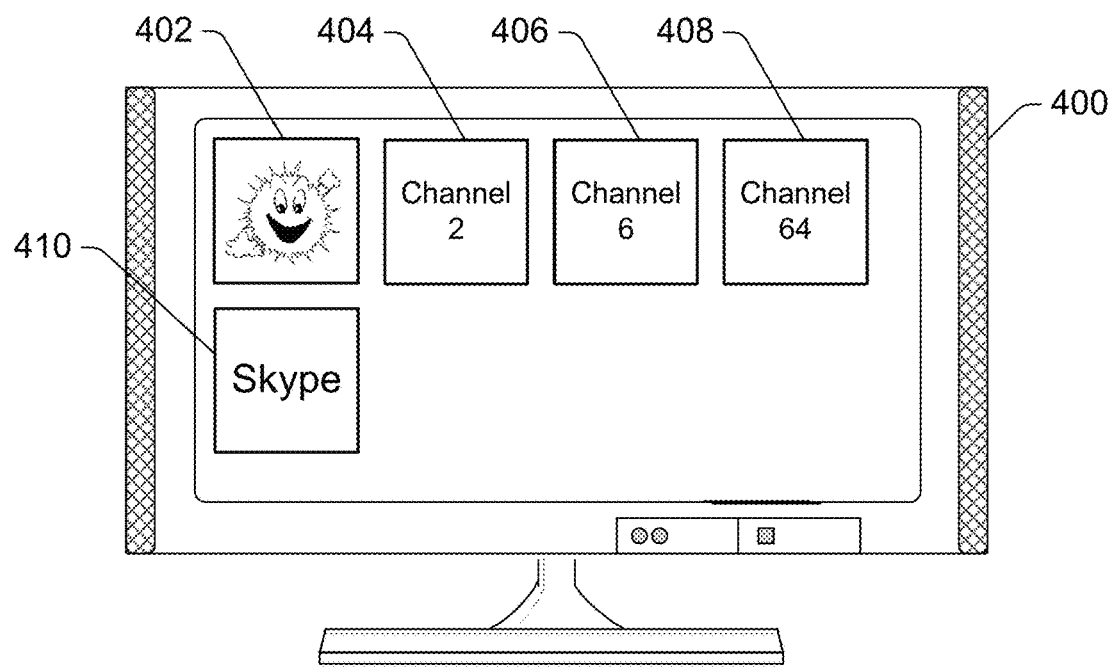

FIG. 4 illustrates a display device 400 that is a television, and a home screen that includes five user-selectable representations 402, 404, 406, 408, and 410. A weather program is run or otherwise activated in response to user selection of the representation 402, a program tuning to a television channel 2 is run or otherwise activated in response to user selection of the representation 404, a program tuning to a television channel 6 is run or otherwise activated in response to user selection of the representation 406, a program tuning to a television channel 64 is run or otherwise activated in response to user selection of the representation 408, and a video conferencing program is run or otherwise activated in response to user selection of the representation 410.

Figure 5:
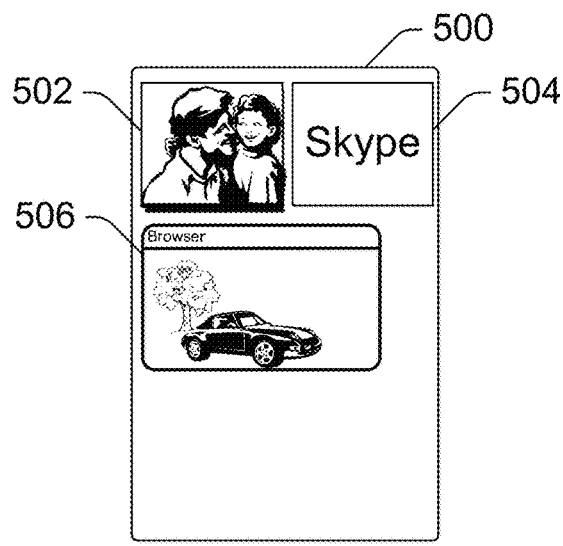

FIG. 5 illustrates a display device 500 that is display device included in a mobile computing device such as a smartphone. A home screen is illustrated that includes three user-selectable representations 502, 504, and 506. A program causing a phone number corresponding to a particular friend or family to be dialed is run or otherwise activated in response to user selection of the representation 502, a video conferencing program is run or otherwise activated in response to user selection of the representation 504, and a Web browser program is run or otherwise activated in response to user selection of the representation 506.

Figure 6:
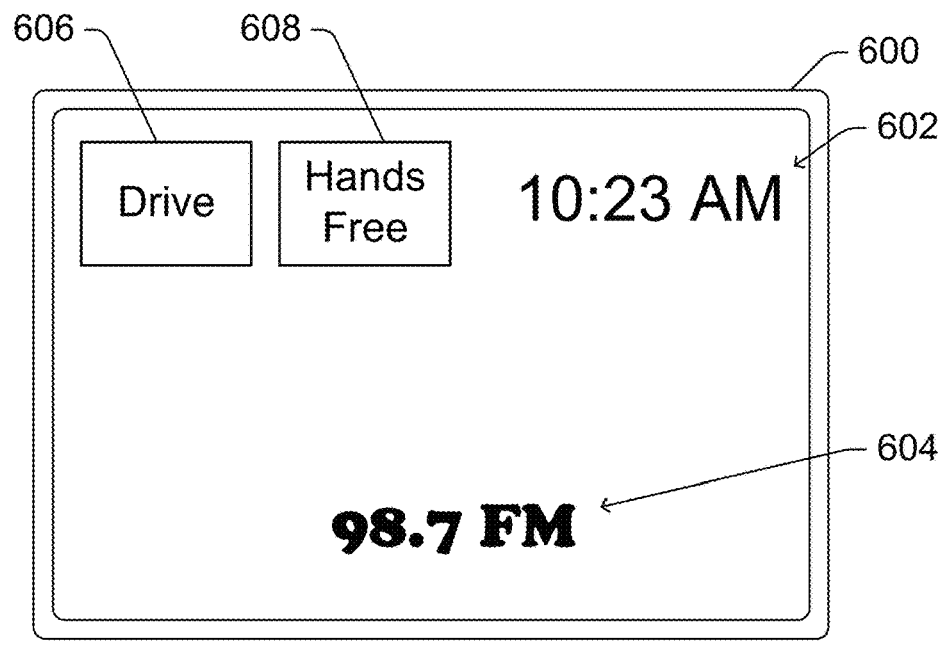

FIG. 6 illustrates a display device 600 that is a display device included in an automobile. A home screen is illustrated that displays a current time 602 and a current radio channel 604 to which a radio is tuned. The illustrated home screen also includes two user-selectable representations 602 and 604. A navigation program is run or otherwise activated in response to user selection of the representation 602, and a hands-free driving application (e.g., supporting hands-free telephone calls) is run or otherwise activated in response to user selection of the representation 604.

It should be noted that the examples shown in FIGS. 3-6 are examples, and that various other types of display devices can be used with the techniques discussed herein. For example, a display device can be a picture frame, an alarm clock, a projector (e.g., projecting a screen on to some surface, or projecting the screen as a heads-up display (HUD)), a watch or other jewelry, eyeglasses, a laptop shell or thin-client laptop (e.g., having a keyboard and display device analogous to a traditional laptop, but the keyboard being a peripheral device 112 of FIG. 1 and the display device being a display device 104 of FIG. 1), and so forth.

The examples shown in FIGS. 3-6 are examples of different home screens for different types of display devices. The same computing device (e.g., computing device 102 of FIG. 1) provides each of these different home screens, and runs or otherwise activates any programs that are to be run or otherwise activated in response to user selection of a representation of functionality displayed on one of the screens.

Returning to FIG. 1, it should also be noted that user inputs are provided to the computing device 102 for processing, and the appropriate screen is generated for display by the computing device 102 in response to such user inputs. For example, assume at a particular point in time that the computing device 102 is coupled to a keyboard and mouse peripheral devices 112, that the computing device is coupled to the display device 104(1), and that the display device is the desktop monitor 300 of FIG. 3. A user input selecting the representation 302 in the form of mouse movements and a mouse click is received by the computing device 102, and in response the computing device 102 runs the word processing program and displays the appropriate word processing program content on the desktop monitor 300 (e.g., in place of, or in addition to, the illustrated home screen).

It should also be noted that the computing device 102 can control multiple different display devices concurrently, with different home screens being displayed on each and controlled independently of one another. The computing device 102 allows each of these different home screens to remain active simultaneously, optionally allowing the representations of functionality or other content displayed as the different home screens to change (e.g., different data displayed within tiles) and allowing the user to interact with either or both of the home screens as he or she desires.

Figure 7:
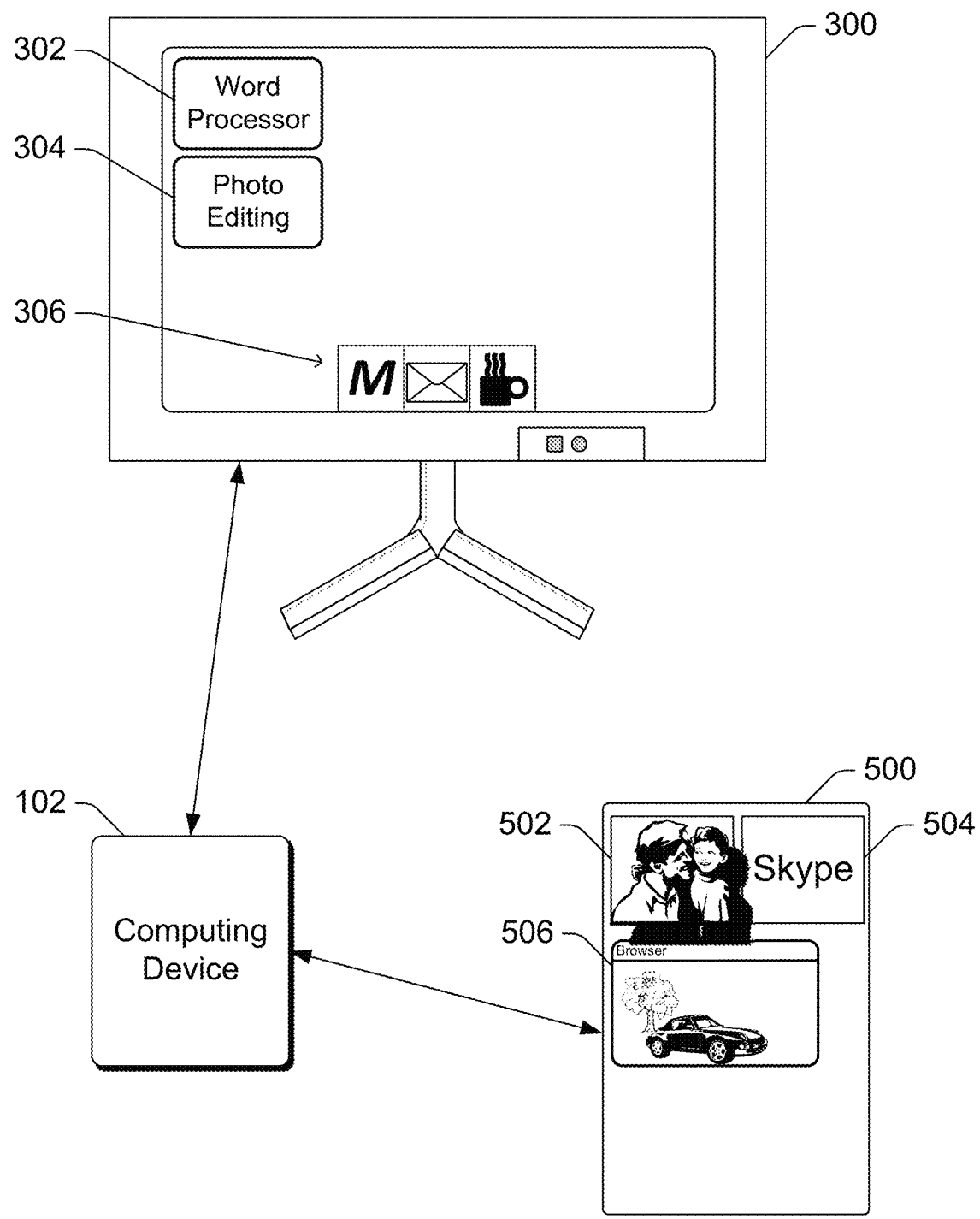
FIG. 7 illustrates an example computing device controlling multiple display devices concurrently in accordance with one or more embodiments.

FIG. 7 illustrates an example computing device controlling multiple display devices concurrently in accordance with one or more embodiments. FIG. 7 illustrates the computing device 102 as a mobile computing device that is coupled concurrently to a desktop monitor (the desktop monitor 300 of FIG. 3) and a display device included as part of the computing device 102 (the smartphone display device 500 of FIG. 5). As illustrated, a different home screen is displayed on each of the display devices 300 and 500 by the computing device 102 concurrently. User input selecting a representation 502, 504, or 506 is received by the computing device 102, and in response the computing device 102 displays an appropriate screen on the display device 500. Similarly, user input selecting a representation 302, 304, or 306 is received by the computing device 102, and in response the computing device 102 displays an appropriate screen on the display device 300. Thus, for example, the user can use the computing device 102 to make a phone call (e.g., in response to user selection of the representation 502) while at the same time the user can begin editing a text document on the display device 300 (e.g., in response to user selection of the representation 302).

Returning to FIG. 2, each display device identifier can have a default home screen state. The default home screen state can be pre-configured in the automatic home screen determination system 110, such as by a developer, distributor, or administrator of the computing device implementing the automatic home screen determination system 110. Alternatively, the default home screen state can be obtained in other manners, such as from another device, from a service via a data network (e.g., a phone network or the Internet), from a user of the computing device implementing the automatic home screen determination system 110, and so forth.

In one or more embodiments, the default home screen state is specified by a user of the computing device implementing the automatic home screen determination system 110. Different default home screen states can be associated with particular user experiences (e.g., workplace, automobile, entertainment). The user can specify a user experience for a particular display device identifier, and the default home screen state associated with that user experience is used as the default home screen state for the particular display device identifier. The home screen state can subsequently be changed by the user, as discussed in more detail below.

The default home screen state for a display device, regardless of how obtained or specified, allows the default home screen state to be used regardless of whether the user has previously used a particular display device. For example, a hotel office suite, a conference room, or other room can have a display device (e.g., desktop monitor, projector, television, etc.) that the user has not used before. However, based on the display device identifier of the display device in that room, the default home screen state for the display device in that room is used even though the user has never used that particular display device before.

The automatic home screen determination system 110 also includes a home screen personalization module 204 that allows a user to change or customize the home screen corresponding to a particular display device identifier. Various different user inputs can be received to change a home screen, such as a user input changing the location of a representation of functionality on the home screen, a user input adding a representation of functionality to the home screen, a user input deleting a representation of functionality from the home screen, a user input changing a size of a representation of functionality on the home screen, and so forth. Any such changes are received by the home screen personalization module 204 and saved in the home screen state data store 208 as the home screen state. Thus, the next time the identified display device is coupled to the computing device, the home screen display module 206 displays the changed home screen to the user.

The changes to a home screen can be for a particular type of display device or for a specific display device. The user can optionally specify whether he or she desires changes to a home screen to be for a particular type of display device or for a specific display device. For example, an entry 210(1) can include a display device identifier of a type of display device that is a desktop monitor, and any changes to the home screen for a desktop monitor are recorded in the entry 210(1). If the computing device implementing the automatic home screen determination system 110 is subsequently coupled to that same desktop monitor or any other desktop monitor, then the changed home screen state in the entry 210(1) is the home screen displayed on the desktop monitor. This can allow, for example, the user to have the same customized home screen displayed on his or her desktop monitor at work as well as his or her desktop monitor at home. This can also include other desktop monitors that the user has never used before. For example, the user can have the same customized home screen displayed on a new desktop monitor he or she just purchased, on a desktop monitor in a hotel suite or conference room that the user has not been in before, and so forth.

By way of another example, an entry 210(2) can include a display device identifier of a specific display device that is a television, and any changes to the home screen for that particular television are recorded in the entry 210(2). If the computing device implementing the automatic home screen determination system 110 is subsequently coupled to that same television, then the changed home screen state in the entry 210(2) is the home screen displayed on that television. However, if the computing device implementing the automatic home screen determination system 110 is subsequently coupled to a different television, then the changed home screen state in the entry 210(2) is not the home screen displayed on that different television.

Rather, another default home screen (or changed home screen for that different television) is displayed on that different television (even if that different television is a same make and model as the television identified in the entry 210(2)).

In one or more embodiments, a user can make different changes to a home screen for a particular type of display device or for a specific display device. The user can then select, by providing any of a variety of user inputs as discussed above, which changes are to be used at any given time. For example, an entry 210 can include multiple different home screen states associated with a display device identifier, each home screen state reflecting different changes to the home screen, and the user selects one of those different home screen states. E.g., a user can change the home screen of a desktop monitor at the user's home office in one manner for a "personal" home screen state and in another manner for a "work" home screen state. The user can then choose which of those two home screen states is to be used at any given time. One of the multiple home screen states can be a default home screen state that is displayed in the absence of a user selection of a home screen state.

It should be noted that situations can arise in which an entry 210 identifies a type of display device, and another entry 210 identifies a specific display device of that same type. In such situations, if the specific display device is identified by the display device identification module 202, then the entry 210 that identifies the specific display device is used to determine the home screen state rather than the entry that identifies the type of display device. For example, assume that entry 210(1) identifies a desktop monitor type of display device, and that entry 210(2) identifies a specific desktop monitor. If the display device identification module 202 identifies that the specific desktop monitor is coupled to the computing device, then the home screen display module 206 uses the home screen state in the entry 210(2) to display the home screen on that desktop monitor. However, if the display device identification module 202 identifies another desktop monitor (other than the specific desktop monitor) is coupled to the computing device, then the home screen display module 206 uses the home screen state in the entry 210(1) to display the home screen on that desktop monitor.

In addition to representations of functionality as discussed above, various other aspects of the home screen can be automatically determined based on the display device. The state of these other aspects is included as part of the home screen state in the home screen state data store 208, and the state of these other aspects can be changed by the user analogous to changing the representations of functionality as discussed above.

One aspect of the home screen that can be automatically determined by the automatic home screen determination system 110 is notification settings. Various different programs display notifications, such as windows, icons, and so forth notifying the user that some program event has occurred, such as receipt of an incoming phone call, receipt of a text message, receipt of an email message, and so forth. The automatic home screen determination system 110 controls whether and/or how such notifications are displayed based on the display device. Different types of notifications (e.g., notifications from different programs) can be controlled differently (e.g., whether and/or how notifications are displayed based on the display device for notifications from one program (e.g., a social networking program) can be different than whether and/or how notifications are displayed based on the display device for notifications from another program (e.g., a text messaging program or telephone program). Different default state can be used for different display devices, and this default state can be changed as desired by the user.

For example, for a desktop monitor display device, text and email receipt notifications are displayed along with an indication (e.g., some of the text, a subject line, a thumbnail preview, etc.) of the received text or email. However, for a television or projector display device (e.g., whether other people may be able to see the displayed indications), text and email receipt notifications may not be displayed. How a notification is displayed can include an amount of information that is displayed in the notification. For example, for a television or projector display device, the text and email receipt notifications may be displayed but without any indication of the received text or email (e.g., the notifications displayed may be a simple "text message received" pop-up window), but for a desktop monitor the text and email receipt notifications may be displayed with more details (e.g., a subject and/or body of the message).

Additionally or alternatively, one aspect of the home screen that can be automatically determined by the automatic home screen determination system 110 is additional content settings. Various different additional content (e.g., advertisements) can be displayed on the home screen. The automatic home screen determination system 110 controls which additional content and/or how that additional content is displayed on the display device. Different default state can be used for different display devices, and this default state can be changed as desired by the user.

For example, additional content may be obtained by the computing device for display on the home screen, and this additional content can be displayed in a different size, a different resolution, and so forth based on the display device. E.g., the additional content may be displayed larger on a desktop monitor display device than on an automotive display device. By way of another example, a service providing additional content (e.g., via a data network such as the Internet) may provide multiple different versions of additional content, and which piece of content is displayed various based on the display device. E.g., a version of the additional content with text and images may be displayed on a desktop monitor display device, and a version of the additional content with images but no text may be displayed on an automotive display device.

Figure 8:
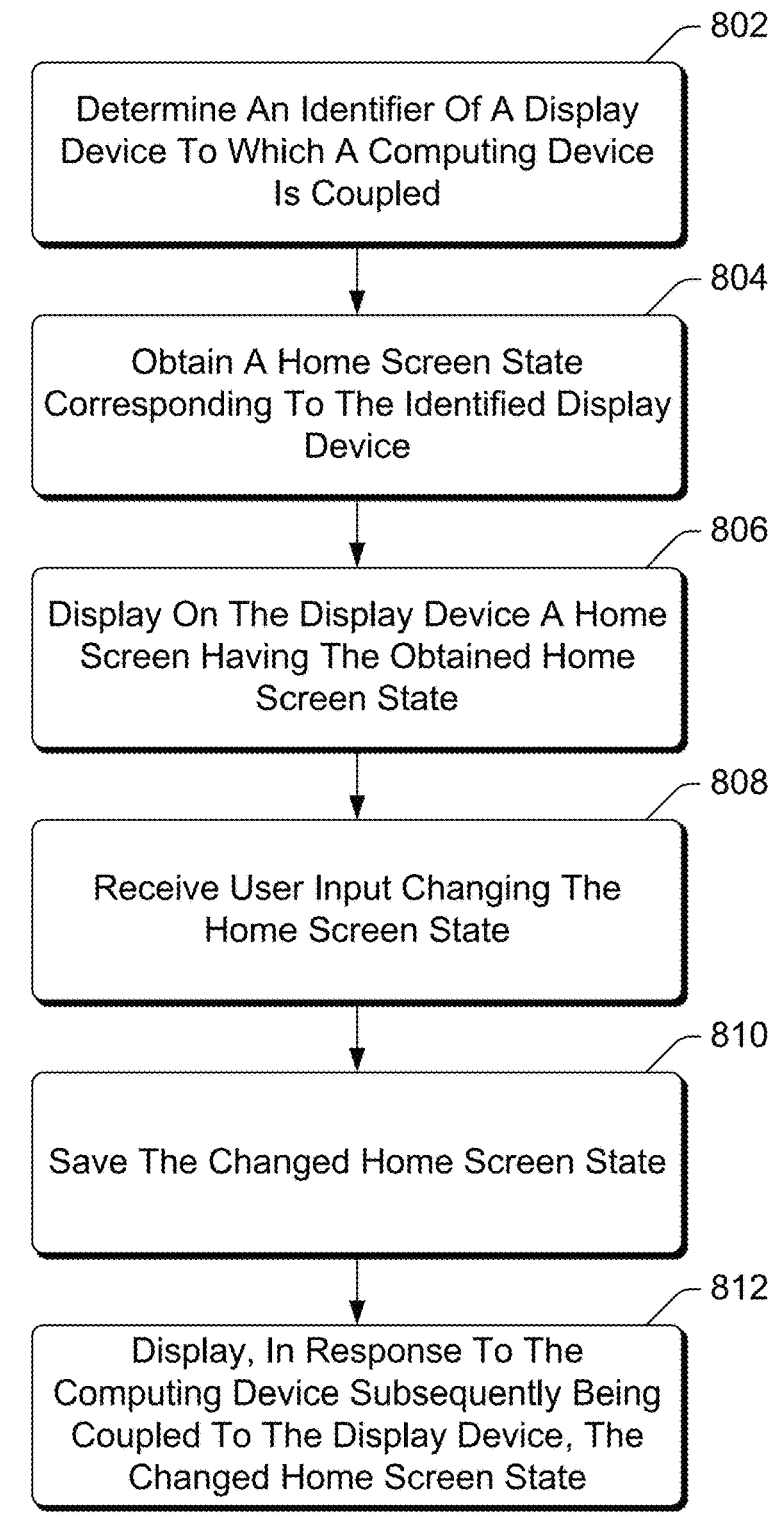
FIG. 8 is a flowchart illustrating an example process for displaying home screens based on display devices in accordance with one or more embodiments.

FIG. 8 is a flowchart illustrating an example process 800 for displaying home screens based on display devices in accordance with one or more embodiments. Process 800 is carried out by an automatic home screen determination system, such as the automatic home screen determination system 110 of FIGS. 1 and 2, and can be implemented in software, firmware, hardware, or combinations thereof. Process 800 is shown as a set of acts and is not limited to the order shown for performing the operations of the various acts. Process 800 is an example process for displaying home screens based on display devices; additional discussions of displaying home screens based on display devices are included herein with reference to different figures.

In process 800, an identifier of a display device to which a computing device is coupled is determined (act 802). The identifier can be determined in different manners as discussed above, such as being received from the display device, being based on a context of the display device, being received as user input, and so forth. The identifier can be an identifier of a type of display device and/or a specific display device.

A home screen state corresponding to the identified display device is obtained (act 804). Different home screen states are maintained in a home screen state data store as associated with or corresponding to different display device identifiers as discussed above.

A home screen having the obtained home screen state is displayed on the display device (act 806). The home screen state corresponds to a particular display device identifier, so different home screens can be displayed for different display device identifiers.

A user input changing the home screen state is received (act 808). This change can take various forms, such as moving a representation of functionality, adding a representation of functionality, deleting a representation of functionality, and so forth. The change can be any change to the user experience displayed or otherwise presented by the home screen as discussed above.

The changed home screen state is saved (act 810). The changed home screen state is saved in the home screen state data store as associated with or corresponding to the display device identifier. The changed home screen state overwrites or replaces the previous home screen state for the identified display device. A copy of the previous home screen state can optionally be saved, allowing the user to quickly undo the change if desired.

In response to the computing device subsequently being coupled to the display device, the changed home screen state is displayed (act 812). The display device can be uncoupled from the computing device and any amount of time can elapse before the display device is again coupled to the computing device. However, at such time as the display device is again coupled to the computing device, the changed home screen state is displayed in act 812. Different home screen states can also be maintained by the automatic home screen determination system, and the user can select which of those home screen states is displayed as discussed above.

Figure 9:
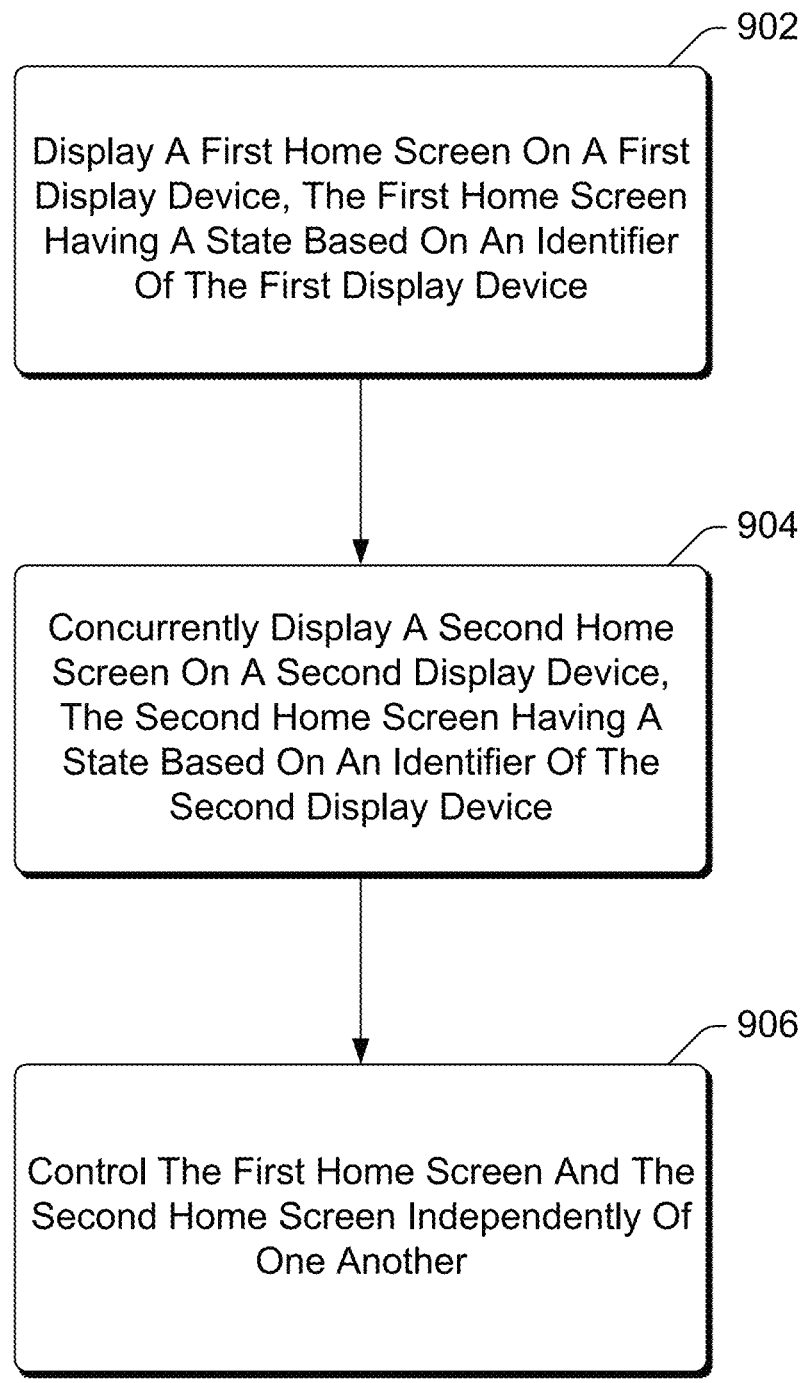
FIG. 9 is a flowchart illustrating an example process for displaying home screens on multiple display devices concurrently in accordance with one or more embodiments.

FIG. 9 is a flowchart illustrating an example process 900 for displaying home screens on multiple display devices concurrently in accordance with one or more embodiments. Process 900 is carried out by an automatic home screen determination system, such as the automatic home screen determination system 110 of FIGS. 1 and 2, and can be implemented in software, firmware, hardware, or combinations thereof. Process 900 is shown as a set of acts and is not limited to the order shown for performing the operations of the various acts. Process 900 is an example process for displaying home screens on multiple display devices concurrently; additional discussions of displaying home screens on multiple display devices concurrently are included herein with reference to different figures.

In process 900, a first home screen is displayed on a first display device (act 902). The first home screen has a home screen state that is based on an identifier of the first display device. The identifier of the first display device can be determined in different manners as discussed above, such as being received from the display device, being based on a context of the display device, being received as user input, and so forth. The identifier of the first display device can be an identifier of a type of the first display device and/or a specific display device that is the first display device.

Concurrent with the display of the first home screen on the first display device, a second home screen is displayed on a second display device (act 904). The second home screen has a home screen state that is based on an identifier of the second display device. The identifier of the second display device can be determined in different manners as discussed above, such as being received from the display device, being based on a context of the display device, being received as user input, and so forth. The identifier of the second display device can be an identifier of a type of the second display device and/or a specific display device that is the second display device. The identifier of the second display device can be determined in the same or a different manner as the identifier of the first display device is determined.

The first home screen and the second home screen are controlled independently of one another (act 906). Different programs can be run from the different home screens, and interaction with or changes to one of the home screens does not affect the other of the home screens.

The techniques discussed herein support various usage scenarios. The computing device controls multiple different display devices concurrently, providing home screens on the different display devices that are independent of one another. This improves the usability of the computing device by providing the user with the look and feel of having two different computing devices, although a single computing device is used. This alleviates the need for additional computing device hardware (processors, memory, storage devices, etc.)—the user need only acquire a new display device yet feels as if he or she has an entirely new computer.

Multiple different display devices are controlled by the same computing device, optionally concurrently. Despite being controlled by the same computing device, the home screens displayed on the different display devices can be different and can be personalized by the user, improving the usability of the computing device by providing the user with the look and feel of having multiple different computing devices although a single computing device is used. By controlling multiple different display devices with the same computing device, various different additional effects are realized. Data network bandwidth usage is reduced due to data not needing to be synchronized between multiple different computing devices. For example, where a user may have previously synchronized data between his or her workplace computer, laptop computer, and smartphone, using the techniques discussed herein all the data is stored on a single computing device and data transfers to enable such synchronizing need not occur. Data security is also increased due to data not needing to be transferred between different computing devices. For example, where a user may have previously transferred data between his or her laptop computer and smartphone, using the techniques discussed herein all the data is stored on a single computing device, alleviating the need for keeping the data secure at multiple computing devices as well as during the transfer between the computing devices.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
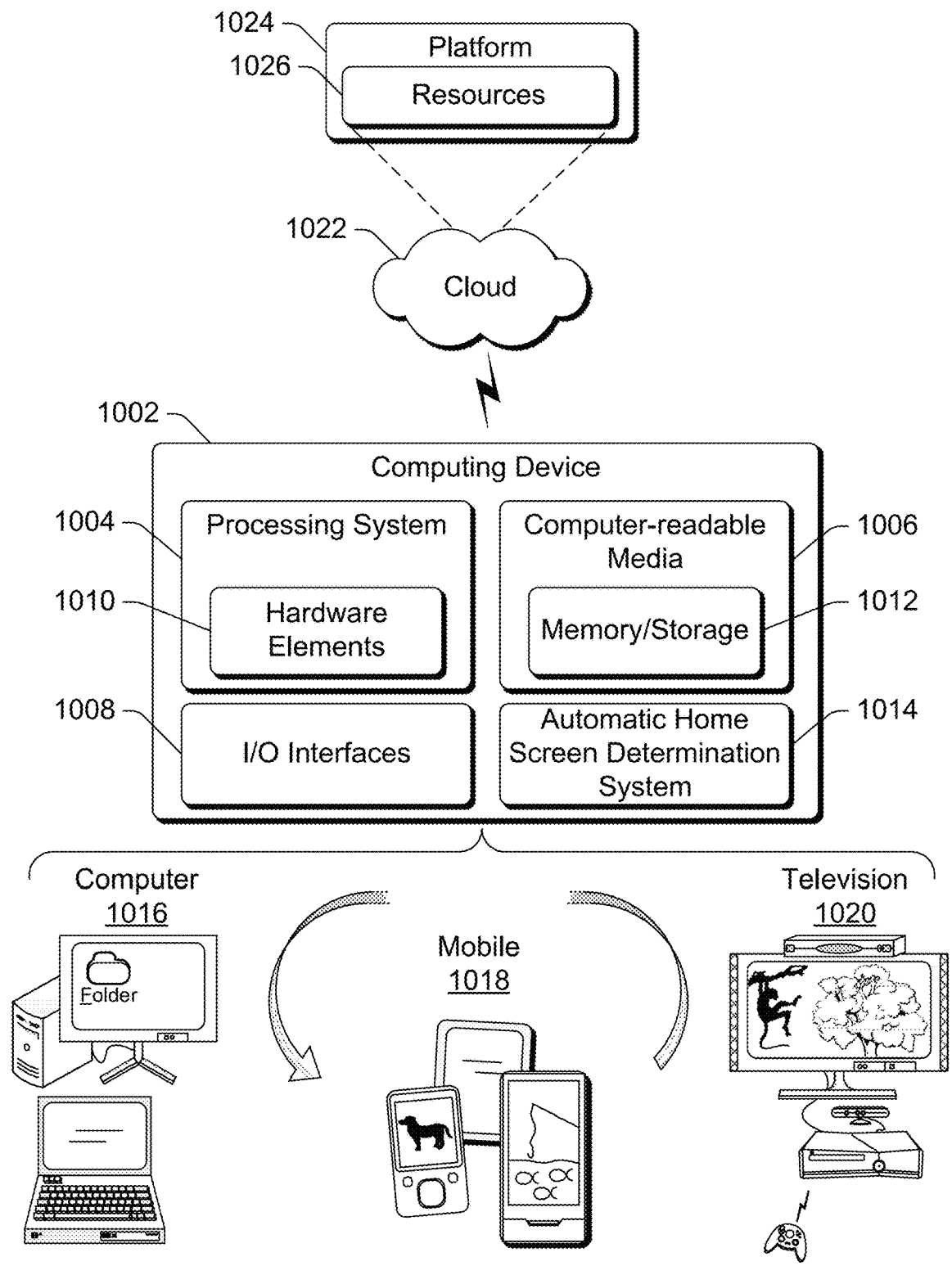
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

The computing device 1002 also includes an automatic home screen determination system 1014. The automatic home screen determination system 1014 provides various functionality supporting different home screens based on different display devices as discussed above. The automatic home screen determination system 1014 can implement, for example, the automatic home screen determination system 110 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method, implemented in a mobile computing device, to improve usability of the mobile computing device by providing a user with a look and feel of having multiple computing devices from the mobile computing device, the method comprising: determining an identifier of a display device to which the mobile computing device is coupled; accessing a storage device to obtain a home screen for the display device; controlling the display device to display the home screen on the display device, the home screen having a state based on the identified display device; receiving user input changing the state of the home screen, the changing including changing the user experience presented by the home screen; saving, by the mobile computing device, the changed state of the home screen; and displaying, in response to the mobile computing device being subsequently coupled to the display device, the home screen having the changed state.

Alternatively or in addition to any of the above described methods, any one or combination of: the determining the identifier of the display device comprising determining the identifier of the display device based on a configuration value provided by the display device, the configuration value identifying a type of the display device or a specific display device; the determining the identifier of the display device comprising determining the identifier of the display device based on a context or characteristics of the display device; the determining the identifier of the display device comprising determining the identifier of the display device based on a user input specifying a type of the display device or a specific display device; the changing the user experience presented by the home screen including rearranging representations of functionality on the home screen, the representations of functionality comprising one or more representations selected from the group including tiles, icons, and menu items; the identifier of the display device comprising an identifier of a type of the display device; the identifier of the display device comprising an identifier of a specific display device; the method further comprising determining an identifier of an additional display device to which the mobile computing device is coupled, displaying, concurrently with displaying the home screen on the display device, an additional home screen on the additional display device, the additional home screen having a state based on the identified additional display device, and controlling by the mobile computing device the home screen and the additional home screen independently of one another.

A method, implemented in a mobile computing device, to improve usability of the mobile computing device by providing a user with a look and feel of having multiple computing devices from the mobile computing device, the method comprising: accessing a storage device to obtain a first home screen for a first display device; displaying the first home screen on a first display device of multiple display devices, the first home screen having a state based on an identifier of the first display device; accessing the storage device to obtain a second home screen for a second display device; displaying, concurrently with displaying the first home screen on the first display device, the second home screen on a second display device of the multiple display devices, the second home screen having a state based on an identifier of the second display device; and controlling by the mobile computing device the first home screen and the second home screen independently of one another.

Alternatively or in addition to any of the above described methods, any one or combination of: the identifier of the first display device comprising an identifier of a type of the first display device, and the identifier of the second display device comprising an identifier of a type of the second display device; the identifier of the first display device comprising an identifier of a specific display device that is the first display device, and the identifier of the second display device comprising an identifier of a specific display device that is the second display device; the first display device comprising a desktop monitor and the second display device comprising a display device included in the mobile computing device; the first display device comprising a display device included in the mobile computing device and the second display device comprising an automobile display device; the controlling including controlling how notifications are displayed on the first display device and the second display device, notifications being displayed differently on the first display device than on the second display device; the controlling including controlling how additional content is displayed on the first display device and the second display device, the additional content being displayed differently on the first display device than on the second display device.

A mobile computing device configured to improve usability of the mobile computing device by providing a user with a look and feel of having multiple computing devices from the mobile computing device, the mobile computing device comprising: an automatic home screen determination system configured to determine a first home screen for display on a first display device of multiple display devices, the first home screen having a state based on an identifier of the first display device and obtained from a storage device based on the identifier of the first display device, and determine a second home screen for display on a second display device of the multiple display devices, the second home screen having a state based on an identifier of the second display device and obtained from the storage device based on the identifier of the second display device; and an output module configured to concurrently control the first display device and the second display device by displaying the first home screen on the first display device and the second home screen on the second display device, and control the first home screen and the second home screen independently of one another.

Alternatively or in addition to any of the above described mobile computing devices, any one or combination of: the identifier of the first display device comprising an identifier of a type of the first display device, and the identifier of the second display device comprising an identifier of a type of the second display device; the identifier of the first display device comprising an identifier of a specific display device that is the first display device, and the identifier of the second display device comprising an identifier of a specific display device that is the second display device; the automatic home screen determination system being further configured to control whether notifications are displayed on the first display device and the second display device as well as how notifications are displayed on the first display device and the second display device, notifications being displayed differently on the first display device than on the second display device; the automatic home screen determination system being further configured to control how additional content is displayed on the first display device and the second display device, the additional content being displayed differently on the first display device than on the second display device; the automatic home screen determination system being further configured to: receive a first user input changing the state of the first home screen; save the changed state of the first home screen; determine, as the first home screen for display on the first display device in response to the mobile computing device being subsequently coupled to the first display device, the first home screen with the changed state; receive a second user input changing the state of the second home screen; save the changed state of the second home screen; and determine, as the second home screen for display on the second display device in response to the mobile computing device being subsequently coupled to the second display device, the second home screen with the changed state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a mobile computing device, the method comprising:
   establishing a communication coupling to a display device;
   responsive to establishing the communication coupling to the display device, determining a type of the display device;
   determining that the type of the display device is of a same type as an additional type of a different display device;
   selecting a customized home screen based at least on an association between the customized home screen and the additional type of the different display device, wherein the customized home screen was customized during a previous communication coupling between the mobile computing device and the different display device by rearranging representations of functionality on a default home screen; and
   causing display of the customized home screen on the display device.

2. The method of claim 1, wherein the communication coupling to the display device comprises a first instance of the mobile computing device being coupled to the display device.

3. The method of claim 1, wherein the determining the type of the display device comprises determining the type of the display device based on a configuration value provided by the display device.

4. The method of claim 1, wherein the type of the display device comprises one of a desktop monitor type, a television display type, an automotive display type, a tablet type, or a projector type.

5. The method of claim 1, wherein the determining the type of the display device comprises determining the type of the display device based on a context or a characteristic the display device.

6. The method of claim 1, wherein the determining the type of the display device comprises determining the type of the display device based on an input specifying the type of the display device or a specific display device.

7. The method of claim 1, wherein the customized home screen further comprises customization of notification settings for one or more applications of the mobile computing device.

8. The method of claim 1, wherein the representations of functionality comprise one or more representations selected from a group including: tiles, icons, and menu items.

9. A method implemented in a mobile computing device, the method comprising:
 determining a type of a first display device to which the mobile computing device is communicatively coupled;
 causing display of a default home screen on the first display device, the default home screen having a state based on the type of the first display device;
 responsive to receiving an input changing the state of the default home screen, changing a user experience presented by the default home screen;
 saving, by the mobile computing device, the default home screen having the changed state as a customized home screen and associating the customized home screen with the type of the first display device; and
 in response to a subsequent communicative coupling of the mobile computing device to a different display device:
 determining a type of the different display device;
 determining that the type of the different display device is of a same type as the first display device; and
 selecting the customized home screen based at least on an association between the customized home screen and the type of the first display device, wherein the customized home screen was customized during the previous communicative coupling between the mobile computing device and the first display device by rearranging representations of functionality on the default home screen.

10. The method of claim 9, wherein the subsequent coupling of the mobile computing device to the different display device comprises a first instance of the mobile computing device being coupled to the different display device.

11. The method of claim 9, further comprising causing display, on the different display device, of the customized home screen.

12. The method of claim 9, wherein the determining the type of the first display device comprises determining the type of the first display device based on a configuration value provided by the first display device.

13. The method of claim 9, wherein the determining the type of the first display device comprising determining the type of the first display device based on a context or a characteristic of the first display device.

14. The method of claim 9, wherein the determining the type of the first display device comprises determining the type of the first display device based on an input specifying the type of the first display device or a specific display device.

15. The method of claim 9, wherein the customized home screen further comprises customization of notification settings for one or more applications of the mobile computing device.

16. The method of claim 9, wherein the representations of functionality comprise one or more representations selected from a group including: tiles, icons, and menu items.

17. The method of claim 9, wherein the type of the first display device comprises an identifier of the type of the first display device.

18. A mobile computing device comprising:
 at least a memory and a processor to perform operations, the operations comprising:
 responsive to establishing a communication coupling to a display device, determining a type of the display device;
 determining that the type of the display device is of a same type as an additional type of a different display device;
 selecting a customized home screen based at least an association between the customized home screen and the additional type of the different display device, wherein the customized home screen was customized during a previous communication coupling between the mobile computing device and the different display device by rearranging representations of functionality on a default home screen; and
 causing display of the customized home screen on the display device.

19. The mobile computing device of claim 18, wherein the communication coupling to the display device comprises a first instance of the mobile computing device being coupled to the display device.

20. The mobile computing device of claim 18, wherein the type of the display device comprises an identifier of the type of the display device.

* * * * *